Oct. 17, 1967  W. D. BAILEY ETAL  3,347,080
METHOD OF FORMING NUTS
Filed Feb. 8, 1963  2 Sheets-Sheet 1
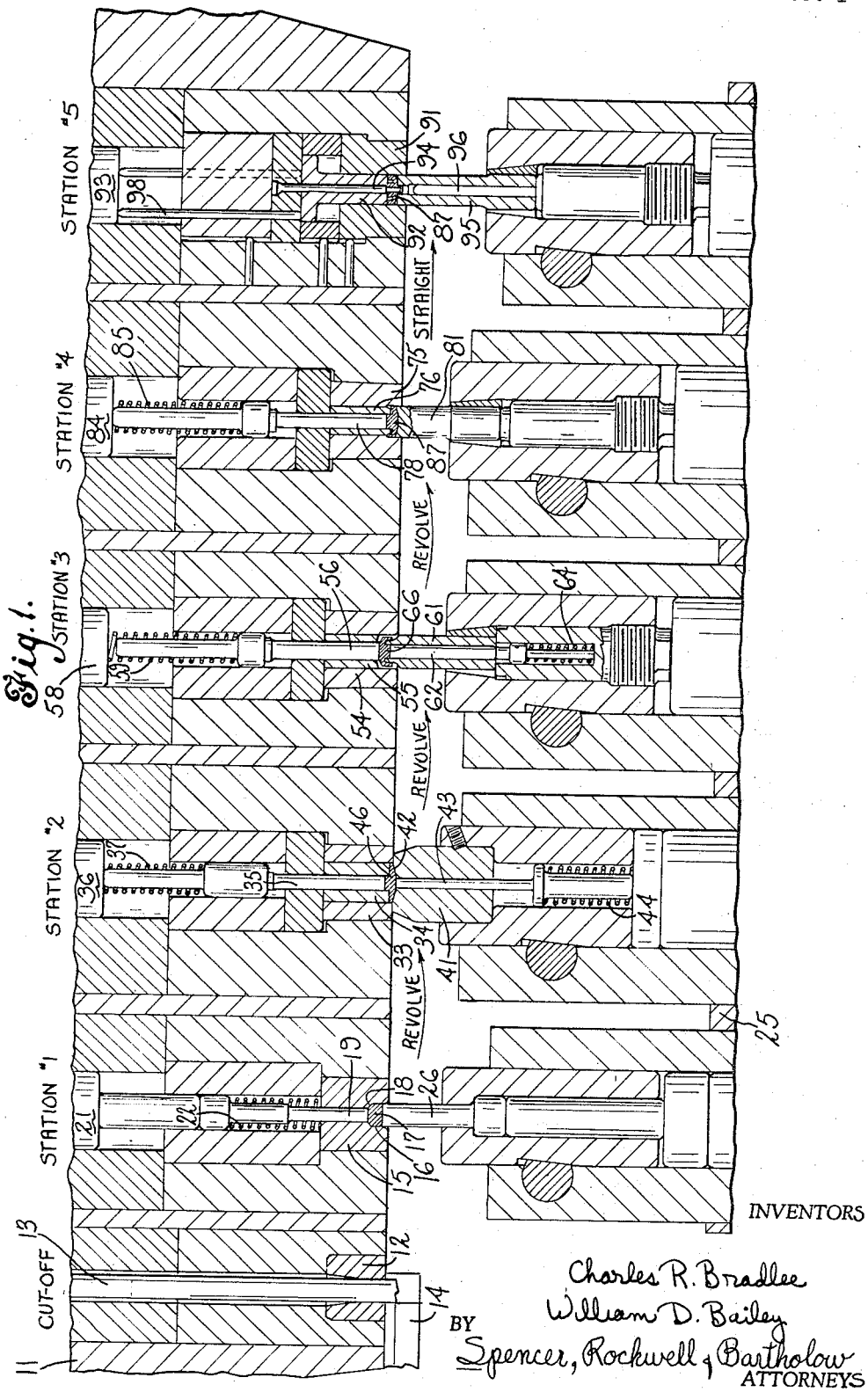
INVENTORS
Charles R. Bradlee
William D. Bailey
BY
Spencer, Rockwell & Bartholow
ATTORNEYS Oct. 17, 1967      W. D. BAILEY ETAL      3,347,080
METHOD OF FORMING NUTS
Filed Feb. 8, 1963      2 Sheets-Sheet 2
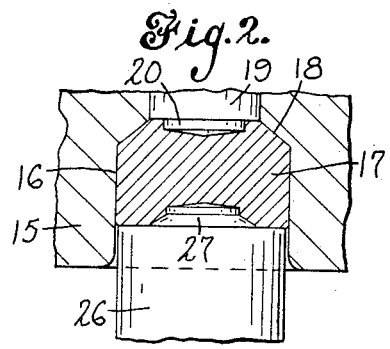
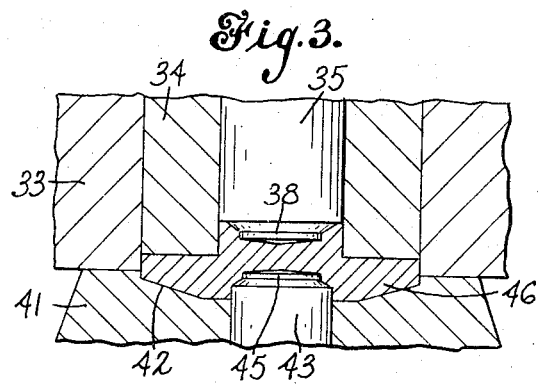
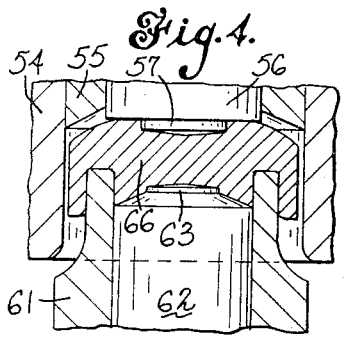
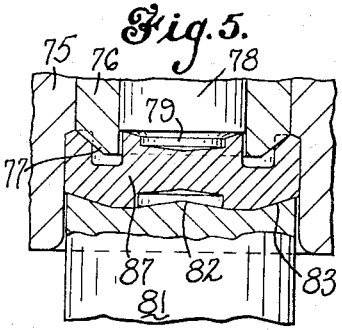
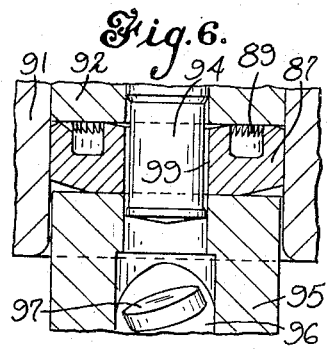
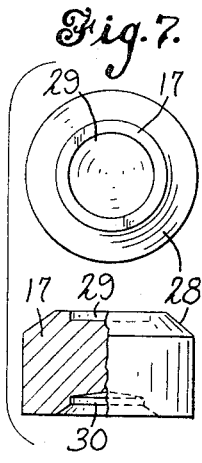
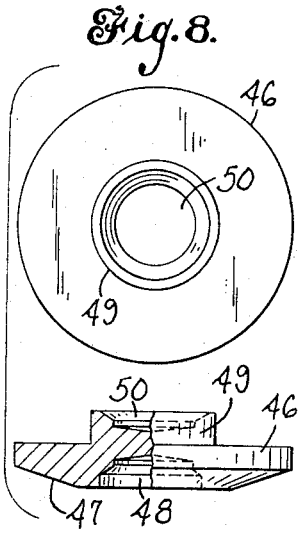
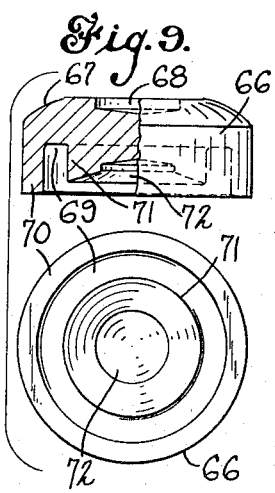
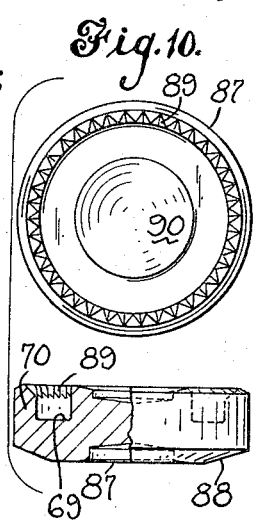
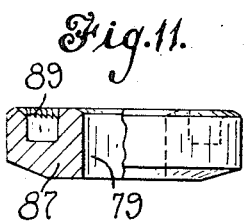
INVENTORS
Charles R. Bradlee
William D. Bailey
BY Spencer, Rockwell & Bartholow
ATTORNEYS

United States Patent Office 3,347,080
Patented Oct. 17, 1967

3,347,080
METHOD OF FORMING NUTS
William Dunn Bailey and Charles Robert Bradlee, Cheshire, Conn., assignors to Textron Inc., Providence, R.I., a corporation of Rhode Island
Filed Feb. 8, 1963, Ser. No. 257,198
16 Claims. (Cl. 72—334)

This invention relates to a method of making cup-shaped cylindrical articles, such as cup-shaped nuts, particularly of a type adapted to lock on sheet metal. Such a nut provides a threaded fastener adapted to hold to the sheet metal and secure it against rotation with respect to the sheet metal. More particularly, the invention relates to a method of forming such nuts from wire or bar stock in consecutive operations during which the workpiece is gradually formed into the finished article.

The formation of regular-shaped nuts, ones having shouldered washers integral therewith, and other similar shapes having substantially planar faces, by means of cold-forming the articles from rod stock in consecutive steps, is known in the art. However, in order to form irregular or unusual shapes, the methods must be modified and changed and new methods developed in order to produce the desired shapes with the greatest degree of accuracy and the least waste material.

Accordingly, it is one object of this invention to provide a new and improved method of producing cup-shaped articles from rod stock.

Another object of the invention is to provide a method of producing cup-shaped articles having gripping serrations on one surface of the interior walls of the cup-shaped body.

Still another object of the invention is to provide a method of producing a cup-shaped body having a diameter substantially greater than its height from a piece of rod stock having a diameter substantially smaller than the diameter of the final article.

Still other objects and advantages of the invention will in part be obvious and will in part be apparent from the specification.

Generally speaking, in accordance with the invention, a length of rod stock is fed through a cutoff die at the cutoff station of a multiple-station heading machine. A knife or other similar well-known element, shears a workpiece from the rod stock and transfers it to the first station of the machine where a cooperating punch and die axially compress, chamfer and indent the workpiece. Thereafter, the workpiece is transferred to a second station where another cooperating punch and die substantially flatten the workpiece to give it a substantially large shoulder. After transfer to a third station, the shoulder is drawn by means of a cooperating punch and die to form the workpiece into a cup-shaped article. Then, at a fourth station, the cup-shaped article is brought to its finished size and a plurality of serrations are formed on the inside of the walls of the cup. At the final station, the central web of the workpiece is pierced out to form a gripping nut which may be later threaded in a suitable machine.

The invention accordingly comprises the several steps and the relation of one or more of such steps with respect to each of the others thereof, which will be exemplified in the method hereinafter disclosed, and the scope of the invention will be indicated in the claims.

For a fuller understanding of the invention, reference is had to the following description taken in connection with the accompanying drawings, in which:

FIG. 1 is a sectional view of apparatus for carrying out the method in accordance with the invention, showing the cutoff station and five operating stations;

FIG. 2 is an enlarged sectional view of the method performed at station 1;

FIG. 3 is an enlarged sectional view of the method performed at station 2;

FIG. 4 is an enlarged sectional view of the method performed at station 3;

FIG. 5 is an enlarged sectional view of the method performed at station 4;

FIG. 6 is an enlarged sectional view of the method performed at station 5;

FIGS. 7, 8, 9 and 10, each represent an elevational view, partly in section, and a plan view of the workpiece when formed respectively at the first, second, third and fourth stations of the machine; and FIG. 11 is an elevational view, partly in section, of the finished article after it has been ejected from station 5.

For the sake of simplicity, only the apparatus at the operating stations of the machine are shown. Means to operate the punches, knockout pins, and transfer mechanisms are known in the art and no description thereof is deemed necessary.

Referring now to FIG. 1, the apparatus by which the improved method is performed, comprises a die bed 11 in which a plurality of dies are mounted and a gate 25 carrying a plurality of punches. At the cutoff station, a cutoff die 12 is provided with an aperture through which rod stock 13 is fed. A cutoff knife 14 is adapted to slide across the face of cutoff die 12 to sever a preselected length of rod stock fed through the cutoff die. Any known means may be utilized to feed a selected length of rod stock and operate the cutoff knife. The blank or workpiece severed from the rod stock may be carried by the cutoff knife to the first station.

At the first station of the machine (FIGS. 1 and 2), a die 15 is provided with a cavity 16 having a circular cross-section of slightly larger diameter than the workpiece fed to the die by the cutoff knife. The inner corners of die cavity 16 are chamfered as at 18, and extending into the center of the die cavity from the bottom thereof is a knockout rod 19 having a projection 20 on the end face thereof. Knockout rod 19, which is slidably mounted in die 15, engages a knockout bar 21 which holds it stationary during the heading operation. A spring 22, encircling the knockout rod and acting against die 15, urges the knockout rod into contact with the knockout bar. At the first station, gate 25 carries a punch 26 which is also provided with a projection 27 extending therefrom.

The workpiece, delivered from the cutoff station to station 1, is inserted into die cavity 16 as the gate advances, and continued movement of the gate expands the workpiece to fill the die cavity by means of punch 26, thereby increasing the diameter of the workpiece and forming it as shown in FIG. 7. Upon completion of the operation at station 1, the workpiece 17 is provided with a chamfered edge 28, a relatively shallow indent 29 in the face within the chamfered edge and a deeper indent 30 in the opposite face. The chamfered edge may be formed as a straight shoulder or a shoulder having a radius. When the gate recedes, knockout bar 21 advances knockout rod 19 and ejects workpiece 17 from the die cavity. The workpiece is gripped by transfer fingers (not shown) and is transferred to the second station. During the transfer operation, the workpiece is revolved 180°.

At station 2 (FIGS. 1 and 3), a die 33 has mounted therein a sleeve 34 whose outer end is spaced from the surface of the die, thereby forming a cavity. Sleeve 34 has slidably mounted therein a knockout rod 35 backed up against a knockout bar 36. A spring 37 encircling knockout rod 35 engages a knockout bar 36 to urge the knockout rod away from the knockout bar. Knockout rod 35 is provided with a projection 38 at the outer face thereof. The gate carries a punch 41 having a concave cavity 42 into which slidably projects a punch pin 43 from the rear end of the punch. A spring 44 urges the punch pin into the concave cavity, punch pin 43 also having a projecting end 45. It should be noted that, if desired, station 1 can be eliminated and transfer provided directly from cutoff to the station shown in FIG. 3.

The workpiece, after having been transferred to station 2, is brought into contact with knockout rod 35 and the die cavity by advancing punch 41. Projecting end 38 guides in the indent 30 formed at the previous station, while projecting end 45 guides in the previously formed indent 29. As punch 41 continues to advance it contacts and applies axial pressure to the workpiece, thereby deforming it to substantially enlarge its diameter into the cavity formed between die 33, sleeve 34, and concave cavity 42. The workpiece 46, thus formed, has a substantially larger diameter than workpiece 17, with a broad chamfer 47 formed at one edge. The face within the chamfer edge is provided with a deep indent 48 and the other face carries a projecting neck 49 having an indent 50. The indents 48 and 50 are formed by punch pin 43 and knockout rod 35, respectively, after these elements have reached their limit of movement against springs 44 and 37. As the punch is retracted, knockout bar 36 advances and ejects workpiece 46 from the die, whereupon the workpiece is picked up by transfer mechanism and transferred to the third station. During the transfer, the workpiece is again rotated 180°.

At station 3, the die bed carries a die 54 having a sleeve 55 mounted therein, with a knockout rod 56 having a projecting end 57 extending into a cavity formed in die 54 by means of sleeve 55 whose end is below the surface of the die. The outer end of sleeve 55 is concave, as shown in FIG. 4. Knockout bar 58, slidable in the die bed, is adapted to clear the die by means of knockout rod 56 upon completion of the operation. A spring 59 acts to yieldably maintain separation between the knockout bar and the knockout rod. A sleeve-like punch 61 is carried by gate 25 and has slidably mounted therein a punch pin 62 provided with a projecting end 63. The outer end of punch 61, adapted to enter the die cavity, has a reduced cross-section which extends beyond punch pin 62. The workpiece, transferred from station 2, is forced into the die cavity by means of punch 61. Projecting ends 57 and 63 guide the workpiece, and those portions of the workpiece extending radially beyond the workpiece neck are drawn by the sleeve to form the workpiece into a cup-shaped article while maintaining the indent and chamfer or peripheral radius. As shown in FIG. 9, the workpiece 66 is again substantially cylindrical with a rounded chamfer 67 at one edge and an indent 68 in the face within the chamfer. The other face has a deep circumferential cavity 69 defining an annular ridge 70 at the circumferential edge of the workpiece and neck 71 at the axial center of the workpiece. Neck 71 extends toward, but does not reach, the face of the workpiece formed by annular ridge 70. Neck 71 is provided with an indent 72, as shown in FIG. 9.

Upon completion of the heading operation in station 3, punch sleeve 61 is retracted, but workpiece 66 is held in the die cavity by means of punch pin 62 urged outwardly by a spring 64. Thereafter, knockout bar 58 and knockout rod 56 advance to clear the workpiece from the die where it is picked up by a suitable transfer mechanism. The transfer mechanism transfers the workpiece to station 4 and, during the transfer operation, revolves it 180°.

At the fourth station, the die bed carries a die having a sleeve 76 within the die. The outer edges of sleeve 76 are serrated as at 77 (FIG. 5), and slidably mounted within sleeve 76 is a knockout rod 78 having a domed end 79. A punch 81 is mounted to the gate and is adapted to enter the die cavity. The end of punch 81 is provided with a projection 82 within a concave chamber 83.

Upon transfer of the workpiece to station 4, punch 81 advances and urges the workpiece into the die cavity. Knockout rod 78, which is urged outwardly from a knockout bar 84 by means of a spring 85, guides the workpiece by engagement with indent 72 formed at the previous station. Continued advancement of the punch flattens and sizes the workpiece 87 to the shape shown in FIG. 10, trueing the chamfer 88 at one edge thereof and forming a plurality of serrations 89 in the edge formed between annular ridge 70 and deep circumferential indent 69. An indent 90, within the neck, is retained by knockout rod 78, but the face of the neck is brought into the plane of the annular ridge. After workpiece 87 is formed at station 4, the punch is retracted and knockout bar 84 and knock out rod 78 are advanced to eject the workpiece from the die. The workpiece is picked up by a transfer mechanism and transferred to the fifth and final station. It is noted that revolving transfer between stations 4 and 5 is not required.

Station 5 (FIGS. 1 and 6) may consist of any standard web-piercing apparatus and is preferably provided with a die 91 within which is mounted a slidable knockout sleeve 92 operated by means of a knockout bar 93. Mounted within the knockout sleeve, and stationary with respect to the die, is a piercing pin 94. A punch 95 is carried by the gate and the punch is provided with an axial passage 96 whose use will be hereinafter explained.

Workpiece 87 is transferred to station 5 and advancing punch 95 urges the workpiece into the die cavity. Indent 90 guides the workpiece onto piercing pin 94 and the advancement of punch 95 forces the workpiece over the piercing pin to pierce a circular slug 97 from the workpiece into axial passage 96 which will carry away the slugs. After the workpiece is pierced, punch 95 will be retracted by the gate and knockout bar 93 will be advanced by a suitable mechanism to advance the slidably mounted ejecting pins 98 and knockout sleeve 92, to clear the finished article from the die. The finished article, shown in FIG. 11, is substantially the same as shown in FIG. 10, with the exception that hole 99 has been pierced therethrough. This hole may then be threaded to complete the formation of the nut.

In use, the nut would be punched onto a piece of sheet metal, gripping taking place by means of the serrations. The nut thereby provides the sheet metal with a threaded hole in cases where the sheet metal is too thin to have a hole drilled and tapped therethrough. When the sheet metal is bolted in place, the axial pressure caused by tightening of the bolt will more rigidly secure the nut to the sheet metal.

Thus, it is seen that a complex cup-shaped article may be formed from a smaller-diameter piece of rod stock by a series of forming operations, thereby producing a piece having a highly accurate dimensional tolerance. Furthermore, it is noted that this novel method permits utilization of substantially all the metal of the original blank, with only a small portion of scrap resulting from the final piercing operation.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The method of forming a cup-shaped metal article from a cylindrical workpiece comprising, confining the workpiece in a die having a cavity comprised of a shallow opening of substantially greater diameter than that of the workpiece and a deeper opening concentric with the shallow opening, the deeper opening being of smaller diameter than the workpiece, applying pressure by means of a punch to an end face of the workpiece to radially expand and axially compress the workpiece to fill the cavity, form a peripheral chamfer at one end and an indent in the face within the end, form a substantially flat surface on the other end with an axially extending central cylindrical neck portion and an indent within the face of the neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity, so as to draw a portion of the peripheral edge of the workpiece around the sleeve while maintaining the peripheral chamfer and the indents on opposite sides of the workpiece.

2. The method of forming a cup-shaped metal article having a plurality of serrations in the interior edge of the cup-shaped article, as claimed in claim 1, and further including the steps of transferring the workpiece, while rotating it end for end, to a die having a cavity of slightly larger diameter than the workpiece with a sleeve having a serrated end at the bottom of the larger cavity and a cavity of smaller diameter within the sleeve, applying axial pressure on the end having the peripheral chamfer to axially compress and radially expand the workpiece to fill the cavity and form a plurality of serrations in one edge of the folded peripheral portion while maintaining the neck portion, the peripheral chamfer, and the indents in opposite ends.

3. The method of forming a cup-shaped metal article from a workpiece of cylindrical cross-section having a peripheral chamfer on one end and a central indent within the chamfer and on the other end, a substantially flat surface surrounding a central axially projecting neck portion having an indent in the face of the neck portion comprising, confining the workpiece in a die having a cylindrical cavity with a concave bottom, the cavity being of smaller diameter than the workpiece, the workpiece being oriented in the die cavity so that the peripheral chamfer is adapted to be engaged by the concave portion of the cavity, and applying pressure on the flat end surface by means of a sleeve whose outside diameter is smaller than the diameter of the cavity so as to draw a portion of the peripheral edge of the workpiece around the sleeve while applying a resilient biasing pressure to one of the indents and maintaining the peripheral chamfer and the other indent.

4. The method of forming a cup-shaped metal article comprising, cutting a workpiece from a length of solid stock of circular cross-section, confining the workpiece in a die cavity of greater diameter than that of the workpiece, applying pressure to the end faces of the workpiece to expand the diameter of the workpiece to fill the cavity, form a peripheral chamfer at one end thereof and indent both faces thereof, revolving the workpiece end for end and transferring it to a die having a cavity comprised of a shallow opening of substantially greater diameter than that of the workpiece and a deeper opening concentric with the shallow opening, the deeper opening being of smaller diameter than the workpiece, applying pressure to the end faces of the workpiece to radially expand and axially compress the workpiece to fill the cavity, form a peripheral chamfer at one end and an indent in the face within the end, form a substantially flat surface on the other end with an axially extending central cylindrical neck portion and an indent within the face of the neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity so as to draw a portion of the peripheral edge of the workpiece around the sleeve while maintaining the peripheral chamfer and the indents on opposite sides of the workpiece, transferring the workpiece, while rotating it end for end to a die having a cavity of slightly larger diameter than the workpiece with a sleeve having a serrated end at the bottom of the larger cavity and a cavity of smaller diameter within the sleeve, applying axial pressure on the end having the peripheral chamfer to axially compress and radially expand the workpiece to fill the cavity and form a pluarlity of serrations in one edge of the folded peripheral portion while maintaining the neck portion, the peripheral chamfer and the indents in opposite ends, transferring the thus-formed workpiece to a die having a cavity with a central axial punch pin extending from the bottom of the cavity, and applying axial pressure to the end of the workpiece having the peripheral chamfer to force it over the punch pin to pierce out the slug formed between the indents.

5. The method of forming a cup-shaped metal article from a cylindrical workpiece having a chamfer on one end, comprising, confining the workpiece in a die having a shallow opening therein of substantially greater diameter than that of the workpiece and a deeper opening concentric with the shallow opening, the deeper opening being of smaller diameter than the workpiece, applying pressure by means of a punch in engagement with the end having the peripheral chamfer to the end faces of the workpiece to radially expand and axially compress the workpiece to fill the cavity, increase the peripheral chamfer at one end, form a substantially flat surface on the other end with an axially extending cylindrical central neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity, so as to draw a portion of the peripheral edge of the workpiece around the sleeve to form a ridge depending from the side having the peripheral chamfer while maintaining the central neck portion spaced within the ridge.

6. The method of forming a cup-shaped metal article having a plurality of serrations in the interior edge of the cup-shaped article, as claimed in claim 1, and further including the steps of transferring the workpiece, while rotating it end for end, to a die having a cavity of slightly larger diameter than the workpiece with a sleeve having a serrated end at the bottom of the larger cavity and a cavity of smaller diameter within the sleeve, applying axial pressure on the end having the peripheral chamfer to axially compress and radially expand the workpiece to fill the cavity and form a plurality of serrations in the depending ridge while maintaining the neck portion and the peripheral chamfer.

7. The method of forming a cup-shaped metal article from a workpiece of cylindrical cross-section having a peripheral chamfer on one end and, on the other end, a substantially flat surface surrounding a central axially projecting neck portion comprising, confining the workpiece in a die having a cylindrical cavity with a concave bottom, the cavity being of smaller diameter than the workpiece, the workpiece being oriented in the die cavity so that the peripheral chamfer is adapted to be engaged by the concave portions of the cavity, applying pressure on the flat end surface by means of a sleeve whose outside diameter is smaller than the diameter of the cavity so as to draw a portion of the peripheral edge of the workpiece around the sleeve to form a depending ridge while applying a resilient biasing pressure to maintain the neck portion and the peripheral chamfer in the end from which the chamfer depends.

8. The method of forming a cup-shaped metal article comprising, cutting a workpiece from a length of solid stock of circular cross-section, confining the workpiece in a die cavity of greater diameter than that of the workpiece, applying pressure to the end faces of said workpiece to expand the diameter of said workpiece to fill the cavity and form a peripheral chamfer at one end thereof, revolving the workpiece end for end and transferring it to a die having a cavity comprised of a shallow opening of substantially greater diameter than that of the workpiece and a deeper opening concentric with the shallow opening, the deeper opening being of smaller diameter than the workpiece, applying pressure to the end faces of the workpiece to radially expand and axially compress the workpiece to fill the cavity, increase the peripheral chamfer at one end, and form a substantially flat surface on the other end with an axially extending central cylindrical neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity so as to draw a portion of the peripheral edge of the workpiece around the sleeve while maintaining the peripheral chamfer and the neck portion, transferring the workpiece, while rotating it end for end, to a die having a cavity of slightly larger diameter than the workpiece with a sleeve having a serrated end at the bottom of the larger cavity and a cavity of smaller diameter within the sleeve, applying axial pressure on the end having the peripheral chamfer to axially compress and radially expand the workpiece to fill the cavity and form a plurality of serrations in one edge of the peripheral portion while maintaining the neck portion and the peripheral chamfer, transferring the thus-formed workpiece to a die having a cavity with a central axial punch pin extending from the bottom of the cavity, and applying axial pressure to the end of the workpiece having the peripheral chamfer to force it over the punch pin to pierce out an axial slug within the neck portion.

9. The method of forming a cup-shaped metal article from a workpiece of cylindrical cross-section having a relatively thin planar transverse section with a substantially smaller diameter central axially projecting neck portion comprising, confining the workpiece in a die having a cylindrical cavity, the cavity being of smaller diameter than the workpiece, the workpiece being oriented in the die so that the plane end is adapted to be engaged by the bottom of the cavity, and applying pressure to the other end along a circle spaced from the neck portion by means of a sleeve whose outside diameter is smaller than the diameter of the cavity, the end of the sleeve being provided with a small cavity therein encircling the neck portion, so as to draw a portion of the peripheral edge of the workpiece around the sleeve to thereby provide a peripheral ridge extending from the plane end parallel to the central neck portion.

10. The method of forming a cup-shaped metal article from a cylindrical workpiece comprising, cutting a workpiece from a length of solid stock of circular cross-section, by the action of a cooperating punch and die confining the workpiece in a die cavity of greater diameter than that of the workpiece and applying pressure to the end faces of the workpiece to expand the diameter of the workpiece to fill the cavity, transferring the workpiece to a die having a cavity comprised of a shallow opening of substantially greater diameter than that of the workpiece and a deeper opening concentric with the shallow opening, the deeper opening being of smaller diameter than the workpiece, applying pressure to the end faces of the workpiece to radially expand and axially compress the workpiece to fill the cavity to form a plane surface at one end of large diameter and a plane surface on the outer end from which projects an axial cylindrical neck portion, revolving the workpiece end for end and transferring it to a die having a cylindrical cavity with a planar bottom, the cavity being of smaller diameter than the workpiece, applying pressure on the plane end surface on the same side as is the neck portion by means of a sleeve whose outside diameter is smaller than the diameter of the cavity, the sleeve being provided with a cylindrical cavity to engage over the neck portion, so as to draw a portion of the peripheral edge of the workpiece around the sleeve to form a peripheral ridge extending from the plane end parallel to the neck portion.

11. The method of forming a cup-shaped metal article from a cylindrical workpiece comprising, cutting a workpiece from a length of solid stock of circular cross-section, by the action of a cooperating punch and die confining the workpiece in a die cavity of greater diameter than that of the workpiece and applying pressure to the workpiece to expand the workpiece to fill the cavity, transferring the workpiece to a second die having a cavity, applying pressure to the end faces of the workpiece to radially expand and axially compress the workpiece to fill the cavity to form a plane surface at least at one end, revolving the workpiece end for end and transferring it to a die having a cylindrical cavity with a planar bottom, the cavity being of smaller diameter than the workpiece, applying pressure between the center and the circumference of the workpiece by a sleeve whose outside diameter is smaller than the diameter of the cavity, thereby urging the plane surface of the workpiece into the cavity so as to draw a portion of the peripheral edge of the workpiece around the sleeve to form a peripheral ridge.

12. The method of forming a cup-shaped metal article comprising, cutting a workpiece from a length of solid stock of circular cross-section, confining the workpiece in a die cavity of greater diameter than that of the workpiece, applying pressure to the workpiece by means of a sleeve-like punch to expand the diameter of the workpiece to fill the cavity and form a peripheral chamfer at one end, and a centrally projecting cylindrical neck at the other end thereof, revolving the workpiece end for end and transferring it to a die having at least a shallow opening of substantially greater diameter than that of the workpiece, applying pressure to the workpiece to radially expand and axially compress the workpiece, increase the peripheral chamfer at one end, and form a substantially flat surface on the other end while maintaining the circular neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity so as to draw a portion of the peripheral edge of the workpiece around the sleeve while maintaining the peripheral chamfer and the neck portion, transferring the workpiece, while rotating it end for end, to a die having a cavity of slightly larger diameter than the workpiece with a sleeve having a serrated end at the bottom of the larger cavity and a cavity of smaller diameter within the sleeve, applying axial pressure on the end having the peripheral chamfer to axially compress and radially expand the workpiece to fill the cavity and form a plurality of serrations in one edge of the peripheral portion while maintaining the neck portion and the peripheral chamfer, transferring the thus-formed workpiece to a die having a cavity with a central axial punch pin extending from the bottom of the cavity, and applying axial pressure to the end of the workpiece having the peripheral chamfer to force it over the punch pin to pierce out an axial slug within the neck portion.

13. The method of forming a cup-shaped meal article from a cylndrical workpiece having a centrally projecting cylindrical neck portion on one end comprising, confining the workpiece in a die having at least a shallow opening therein of substantially greater diameter than that of the workpiece, applying pressure by means of a punch in engagement with the workpiece to radially expand and axially compress the workpiece to fill the cavity and form a substantially flat surface on the end extending transversely outwardly from the central neck portion, revolving the workpiece end for end and transferring it to a die having a cylindrical cavity with a concave bottom, the cavity being of smaller diameter than the workpiece, applying pressure on the flat end surface by means of a sleeve whose outside diameter is smaller than the diameter of the cavity, so as to draw a portion of the peripheral edge of the workpiece around the sleeve to form a ridge depending from the side having the peripheral chamfer while maintaining the central neck portion spaced within the ridge.

14. The method of forming a cup-shaped metal article from a cylindrical workpiece comprising, confining the workpiece in a die having at least a shallow opening therein of substantially greater diameter than that of the workpiece, applying pressure by means of a punch to radially expand and axially compress the workpiece to fill the cavity and form a peripheral chamfer at one end, revolving the workpiece end for end and transferring it to a die having a cylindrical cavity with a concave bottom, the cavity being of smaller diameter than the workpiece, applying pressure between the center and the circumference of the workpiece opposite the end having the chamfer by a sleeve whose outside diameter is smaller than the diameter of the cavity, so as to draw a portion of the peripheral edge of the workpiece around the sleeve to form a ridge depending from the side having the peripheral chamfer.

15. The method of forming a cup-shaped metal article having a plurality of serrations in the interior edge of the cup-shaped article, as claimed in claim 14, and further including the steps of transferring the workpieces, while rotating it end for end, to a die having a cavity of slightly larger diameter than the workpiece with a sleeve having a serrated end projecting into the bottom of the die cavity, applying axial pressure on the end having the peripheral chamfer to axially compress and radially expand the workpiece to fill the cavity and form a plurality of serrations in the depending ridge.

16. The method of forming a cup-shaped metal article comprising, cutting a workpiece from a length of solid stock of circular cross-section, confining the workpiece in a die cavity of greater diameter than that of the workpiece, applying pressure to the workpiece by means of a sleeve-like punch to expand the diameter of the workpiece to fill the cavity and form a peripheral chamfer at one end, and a centrally projecting cylindrical neck at the other end thereof, revolving the workpiece end for end and transferring it to a die having at least a shallow opening of substantially greater diameter than that of the workpiece, applying pressure to the workpiece to radially expand and axially compress the workpiece, increase the peripheral chamfer at one end, and form a substantially flat surface on the other end while maintaining the circular neck portion, revolving the workpiece end for end and transferring it to a die having a cylindrical cavity with a concave bottom, the cavity being of smaller diameter than the workpiece, and applying pressure on the flat end surface by means of a sleeve whose outside diameter is smaller than the diameter of the cavity so as to draw a portion of the peripheral edge of the workpiece around the sleeve while maintaining the peripheral chamfer and the neck portion.

References Cited

UNITED STATES PATENTS

| | | | |
|---|---|---|---|
| 1,373,725 | 4/1921 | Heiby et al. | 72—334 |
| 1,920,497 | 8/1933 | Clark et al. | 72—353 |
| 2,131,319 | 9/1938 | Greenholtz et al. | 72—267 |
| 2,689,359 | 9/1954 | Friedman | 72—354 |
| 2,748,932 | 5/1956 | Kaul | 72—267 |
| 2,994,952 | 8/1961 | Klooz | 72—334 |
| 3,079,682 | 3/1963 | Bailey | 72—334 |
| 3,124,879 | 4/1964 | Putetti | 72—334 |
| 3,157,943 | 11/1964 | Wurzburger | 72—359 |
| 3,167,859 | 2/1965 | Bailey | 72—352 |
| 3,186,209 | 6/1965 | Friedman | 72—334 |

CHARLES W. LANHAM, *Primary Examiner.*

W. H. JUST, E. M. COMBS, *Assistant Examiner.*